US012545498B2

(12) United States Patent
Lopez et al.

(10) Patent No.: US 12,545,498 B2
(45) Date of Patent: *Feb. 10, 2026

(54) ALL-IN-ONE GIFT PACKAGING SYSTEM

(71) Applicant: Cruickshank LLC, Austin, TX (US)

(72) Inventors: Bobbie Lopez, Scottsdale, AZ (US); James Cruickshank, Scottsdale, AZ (US); Jack Cruickshank, Scottsdale, AZ (US)

(73) Assignee: Cruickshank LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/674,659

(22) Filed: Feb. 17, 2022

(65) Prior Publication Data

US 2022/0169436 A1 Jun. 2, 2022

Related U.S. Application Data

(63) Continuation of application No. 16/601,828, filed on Oct. 15, 2019, now Pat. No. 11,254,490, which is a (Continued)

(51) Int. Cl.
*B65D 85/00* (2006.01)
*B42D 15/02* (2006.01)
(Continued)

(52) U.S. Cl.
CPC ........... *B65D 85/70* (2013.01); *B42D 15/027* (2013.01); *B42D 15/045* (2013.01); *B65D 5/422* (2013.01);
(Continued)

(58) Field of Classification Search
CPC ...... B42D 15/027; B42D 15/045; B65D 5/42; B65D 5/4204; B65D 5/4208; B65D 5/422;
(Continued)

(56) References Cited

U.S. PATENT DOCUMENTS 3,773,251 A 11/1973 Hadick
5,038,930 A 8/1991 Holtkamp
(Continued)

FOREIGN PATENT DOCUMENTS

EP 220827 A1 * 5/1987 ............. B42D 15/04
GB 2101040 A 1/1983
(Continued)

OTHER PUBLICATIONS

European Search Report for EP Application No. 15786229.3 dated Dec. 4, 2017 (7 pages).
(Continued)

*Primary Examiner* — Bryon P Gehman
(74) *Attorney, Agent, or Firm* — Braxton Perrone, PLLC; Bobby W. Braxton; Gregory Perrone

(57) ABSTRACT

A system for a greeting card. The greeting card has a planar greeting card portion and a greeting card cover moveably coupled to the planar greeting card portion. The greeting card cover can move from an open position whereby the planar greeting card portion is readable to a closed position adjacent to said planar greeting card portion whereby the planar greeting card portion is not readable. The greeting card portion is coupled to a gift storage compartment which has a volume and a depth for storing an item. The greeting card cover can open and close without moving the gift storage compartment.

12 Claims, 5 Drawing Sheets

Related U.S. Application Data continuation of application No. 15/251,021, filed on Aug. 30, 2016, now Pat. No. 10,479,598, which is a continuation of application No. 14/693,527, filed on Apr. 22, 2015, now Pat. No. 9,457,946.

(60) Provisional application No. 61/986,788, filed on Apr. 30, 2014.

(51) Int. Cl.

| | |
|---|---|
| ***B42D 15/04*** | (2006.01) |
| ***B65D 5/42*** | (2006.01) |
| ***B65D 33/04*** | (2006.01) |
| ***B65D 33/14*** | (2006.01) |
| ***B65D 73/00*** | (2006.01) |
| ***B65D 75/52*** | (2006.01) |
| ***B65D 75/56*** | (2006.01) |
| ***B65D 77/04*** | (2006.01) |
| ***B65D 81/09*** | (2006.01) |
| ***G09F 1/04*** | (2006.01) |

(52) U.S. Cl.

CPC ......... *B65D 5/4225* (2013.01); *B65D 5/4233* (2013.01); *B65D 73/0014* (2013.01); *B65D 73/0035* (2013.01); *B65D 75/522* (2013.01); *B65D 75/566* (2013.01); *B65D 77/042* (2013.01); *G09F 1/04* (2013.01); *B65D 5/4204* (2013.01); *B65D 5/4208* (2013.01); *B65D 33/04* (2013.01); *B65D 33/14* (2013.01); *B65D 81/09* (2013.01)

(58) Field of Classification Search

CPC .. B65D 5/4223; B65D 5/4225; B65D 5/4233; B65D 33/04; B65D 33/14; B65D 73/00; B65D 73/0014; B65D 73/0035; B65D 75/52; B65D 75/522; B65D 75/566; B65D 85/70

See application file for complete search history.

(56) References Cited

U.S. PATENT DOCUMENTS

| | | | |
|---|---|---|---|
| 5,096,058 | A | 3/1992 | Juravin et al. |
| 5,226,532 | A | 7/1993 | Davidson et al. |
| 5,458,235 | A | 10/1995 | Stone |
| 5,575,384 | A | 11/1996 | Saye |
| 6,070,719 | A | 6/2000 | Pollock |
| 6,659,271 | B2 | 12/2003 | Parsons |
| 6,978,562 | B2 | 12/2005 | Frenkel |
| 7,222,446 | B2 | 5/2007 | Foster |
| 8,272,154 | B2 | 9/2012 | Sapp et al. |
| 8,898,939 | B2 | 12/2014 | Kibbe et al. |
| 8,899,413 | B2 | 12/2014 | Pruett |
| 9,090,115 | B2 | 7/2015 | Shields |
| 9,457,946 | B2 | 10/2016 | Lopez |
| 10,479,598 | B2 | 11/2019 | Lopez |
| 11,254,490 | B2 | 2/2022 | Lopez |
| 2002/0153265 | A1 | 10/2002 | Leung et al. |
| 2003/0230501 | A1 | 12/2003 | Smolev |
| 2006/0138021 | A1 | 6/2006 | Siethoff et al. |
| 2007/0094901 | A1 | 5/2007 | Kibbe et al. |
| 2007/0193079 | A1 | 8/2007 | Sepesy |
| 2013/0213833 | A1 | 8/2013 | Pruett |
| 2015/0136642 | A1 | 5/2015 | Shields |

FOREIGN PATENT DOCUMENTS

| | | | |
|---|---|---|---|
| GB | 2241470 | A | 9/1991 |
| WO | 1993023254 | A1 | 11/1993 |
| WO | 2000002737 | A1 | 1/2000 |
| WO | 2004043707 | A1 | 5/2004 |
| WO | 2005054067 | A1 | 6/2005 |

OTHER PUBLICATIONS

International Preliminary Report on Patentability for International application No. PCT/US15/27778 dated May 19, 2016.
International Search Report for International application No. PCT/US15/27778 dated Aug. 12, 2015 (2 pages).
International Search Report for International application No. PCT/US15/27778 dated Aug. 12, 2015 (3 pages).
Written Opinion for International application No. PCT/US15/27778 dated Aug. 12, 2015 (4 pages).
International Preliminary Report on Patentability for International application No. PCT/US15/27778 dated May 6, 2016.
European Search Report for EP Application No. 15786229.3 dated Nov. 23, 2017 (7 pages).
Australian Examination Report for Application No. 2020203585 dated Feb. 23, 2021 (5 pages).
European Search Report for EP Application No. 20206766.6 dated Nov. 5, 2021 (7 pages).
Australian Examination Report for Application No. 2020203585 dated Feb. 22, 2022 (4 pages).
Australian Examination Report for Application No. 2022201251 dated Jun. 2, 2023 (4 pages).
Non-Final Office Action dated Dec. 13, 2023 (14 pages) from related application U.S. Appl. No. 18/138,548, filed Apr. 24, 2023.

* cited by examiner

ALL-IN-ONE GIFT PACKAGING SYSTEM

PRIORITY

This application is a continuation of application Ser. No. 16/601,828 filed Oct. 15, 2019; which is a continuation of application Ser. No. 15/251,021 filed Aug. 30, 2016, now U.S. Pat. No. 10,479,598 issued Nov. 19, 2019, entitled "All-in-one Gift Packaging System" which is a continuation of application Ser. No. 14/693,527 filed Apr. 22, 2015, now U.S. Pat. No. 9,457,946, issued Oct. 4, 2016, entitled "All-in-one Gift Packaging System" and claims priority to provisional application 61/986,788 filed Apr. 30, 2014, entitled "All-in-one Gift Packaging System", the entirety of all are hereby incorporated by reference.

BACKGROUND OF THE INVENTION

Technical Field

The embodiments described herein relate generally to paper goods, and more particularly, to a gift or greeting card packaging system.

Description of Related Art

Currently, when giving gifts consumers have to buy a greeting card, gift box or bag, gift, and wrapping or gift bag separately, which takes times out of a consumer's day, particularly when the consumer has to travel to more than one store to get the gift components.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures. The invention illustratively disclosed herein suitably may be practiced in the absence of any element which is not specifically disclosed herein.

The following description is meant to disclose further description of the invention. Some embodiments of the present invention include an all-in-one gift packaging system for packaging a gift intended for a receipt. The gift packaging system may include a multipurpose greeting card, a gift storage compartment attached to the multipurpose greeting card, and an expandable card container having a volume sufficient to hold the multipurpose greeting card. In some embodiments, the multipurpose greeting card can include a card portion and a gift storage compartment attached to the card portion, such that the multipurpose greeting card can function as both a greeting card and gift box and/or bag. For example, the gift storage compartment may be configured to hold a gift, such as a candy bar, gift card, other candy, or other gift item.

In one embodiment, the system disclosed herein may be used as a gift card and a gift box or bag for giving someone a gift and can comprise a multipurpose greeting card, expandable card container, and/or gift storage compartment. However, a person having ordinary skill in the art relevant to this field of the present invention will understand that there are potential equivalent options that may be substituted within an embodiment without changing the essential function or operation of the device.

Figure 1:
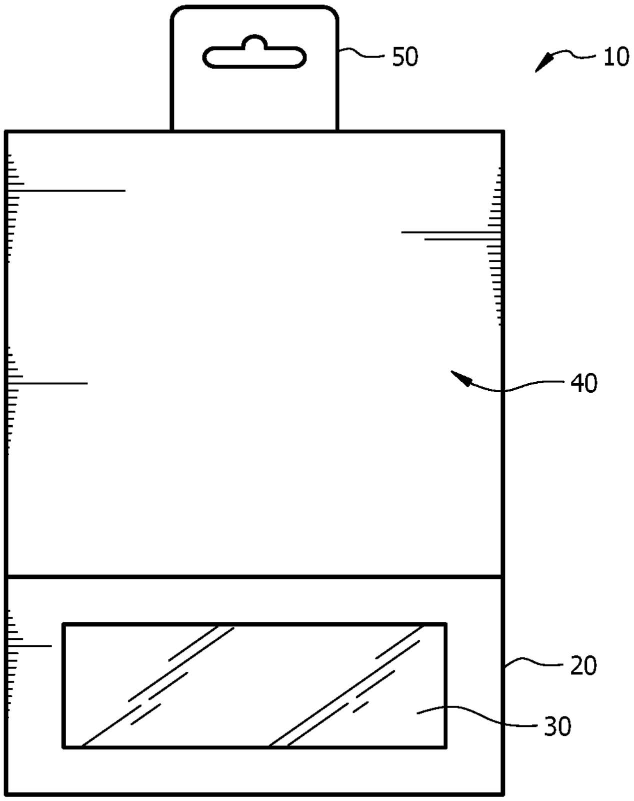
FIG. 1 is a top view of a greeting card in one embodiment.

FIG. 1 is a front view of a greeting card in one embodiment. FIG. 1 depicts a novel all-in-one gift packaging system for giving a gift to an individual. In one embodiment, and as depicted, the system comprises a multipurpose greeting card 10, an optional gift storage compartment 20 that in one embodiment is expandable and has a certain volume where a gift can be placed inside the gift storage compartment 20, a gift storage compartment surface 30, and a greeting card portion 40.

The greeting card portion 40 is the internal surface of a greeting card. In a typical greeting card, the user opens the cover to read what is written in the internal surface of the greeting card. This internal surface upon which messages are written is referred to herein as the greeting card portion. The greeting card portion 40 can be used to write a note, create graphics, or print card messages. The messages or graphics can include any desirable message and can include, but are not limited to happy birthday, congratulations, happy anniversary, or other messages that may either be pre-printed on the greeting card portion, be hand-written by the customer, or comprise private labeling by a third-party in a pre-printed format or custom format. Furthermore, the greeting card portion 40 can include audio or video components which allow the user to listen or watch a video. In one embodiment the greeting card can comprise customized video, images, photos, audio, text, and combinations thereof. The customized video, images, photos, audio and/or text can be uploaded to a website to be used in the greeting cards. In one embodiment the greeting card portion 40 comprises a flat planar surface. In another embodiment, the greeting card portion 40 comprises a slit at the top left corner and a slit at the bottom right corner in order to hold an item, card or gift card. However, the slits can be located in any manner on the multipurpose greeting card 10, gift storage compartment 20, gift storage compartment surface 30, greeting card portion 40, greeting card cover 60, or the expandable card container 80.

Coupled to the greeting card portion 40 is the gift storage compartment 20. While the gift storage compartment 20 is depicted as being below the greeting card portion 40, this is for illustrative purposes only and should not be deemed limiting. The greeting card portion 40 and the gift storage compartment 20 can be coupled via any method or device known in the art including, but not limited to, glue, adhesives, stitching, case, strap, cellophane, hook and loop structures such as Velcro®, rubber band, cellophane overlap, etc. The greeting card portion 40 and the gift storage compartment 20 can be directly coupled or indirectly coupled. They are coupled directly if they are directly coupled to one another. They are indirectly coupled if they are coupled through an intermediate item. In one embodiment the gift storage compartment 20 comprises a separate compartment which is later coupled to the greeting card portion 40. In other embodiments, however, the gift storage compartment 20 and the greeting card portion 40 are integrally made. In one embodiment, the gift storage compartment 20 and the greeting card portion are integrally made from a single sheet of material. In such embodiments the sheet is folded as necessary to produce the desired greeting card 10. Such embodiments have the advantage of fewer pieces, resulting in decreased manufacturing costs. For example, and in one non-limiting embodiment, a single sheet is folded to produce a desire greeting card 10. In another embodiment, the greeting card 10 employs three-dimensional molding or three-dimensional printing to create the greeting card 10. The greeting card 10 can be manufactured via any method known in the art.

The gift storage compartment 20, as used herein, refers to a portion of the greeting card which stores an item. The gift storage compartment 20 comprises a volume and a depth for storing an item. The gift storage compartment 20 can have various sizes and volumes in order to accommodate different sizes of gifts. As an example, the gift storage compartment 20 can have a height of 1, 2, 3, 4, 5, 6, 7, 8, 9, 10, 11, 12, 13, 14, 15, 16, 17, 18, 19, or 20 inches as well as have a width of 1, 2, 3, 4, 5, 6, 7, 8, 9, or 10 inches although other lengths and heights, including smaller and/or larger increments, can be used as well for the gift storage compartment 20. In addition, and in another embodiment, the gift storage compartment 20 can have a depth of a quarter inch, half inch, three-quarters of an inch, 1, 2, 3, 4, 5, 6, 7, 8, 9, 10, 11, 12, 13, 14, 15, 16, 17, 18, 19, or 20 inches in order to accommodate various gift sizes and shapes although other depths and/or volumes can be used to accommodate other gift sizes. In one embodiment the gift storage compartment 20 comprises a three-dimensional volume in which to store an item.

Depending on the desired configuration, the gift storage compartment 20 may be positioned in a variety of positions on the multipurpose greeting card 10, and the gift storage compartment 20 may also be configured to hold any size or shape of gift. In some embodiments the gift storage compartment 20 can be in the shape of a rectangle as shown in FIG. 1, but this is for illustrative purposes only and should not be deemed limiting. In other embodiments the gift storage compartment 20 can comprise any of the following shapes: quadrilateral, triangle, square, trapezoid, octagon, cylinder, and/or circle or any combination of these shapes including variations thereof. As an example, in one embodiment the triangle and quadrilateral may be used together to form the gift storage compartment 20. In another embodiment, the gift storage compartment 20 may take the partial shape of a quadrilateral, triangle, square, trapezoid, octagon, cylinder, and/or circle as long as there is sufficient volume to hold the prospective gift inside the gift storage compartment 20.

The gift storage compartment 20 in some embodiments can hold virtually any gift, including but not limited to candy, such as a candy bar, money, gift cards, notes, another card, a greeting card, flowers, candy, toys, pet gifts, jewelry, perishable and non-perishable gift items, etc. The gift storage compartment 20 can comprise virtually any material including, but not limited to, cardboard, fabric, wood, wood-based products, three dimensional printing techniques and products, three dimensional printing, paper, tin, foil, plastic, rubber, and any combinations or mixtures thereof etc. The gift storage compartment 20 can be soft or rigid in nature. In some embodiments the gift storage compartment 20 comprises a material that would make the gift storage compartment 20 hard in nature such as a gift box, gift bag, package, or other hard structural material. In another embodiment, the gift storage compartment 20 of the multipurpose greeting card 10 may be soft such as a gift bag, plastic bag, plastic, or other material that is pliable in nature. The gift storage compartment 20 can be sealed or unsealed.

In addition and in one embodiment, the system further comprises a gift storage compartment surface 30. In one embodiment, the gift storage compartment surface 30 is a window through which the contents of the gift storage compartment 20 can be partially or fully visible. In one embodiment the gift storage compartment surface 30 comprises a plastic or other material. In one embodiment the gift storage compartment surface 30 comprises a transparent surface such that a person can see the contents of the gift storage compartment 20 when the multipurpose greeting card 10 is opened or in the opened position. In an additional embodiment, the gift storage compartment surface 30 can comprise various colors of material such as plastic that allow for some transparency as to the contents of the gift storage compartment 20 when the multipurpose greeting card 10 is opened or in the opened position.

The gift storage compartment surface 30 can be transparent or opaque. In one embodiment the gift storage compartment surface 30 is transparent or sufficiently transparent to allow a user to view at least some of the contents of the gift storage compartment 20 (e.g., semi-transparent). In another embodiment, the gift storage compartment surface 30 is transparent but only covers a portion of the gift storage compartment 20 such that only a portion of the item(s) within the gift storage compartment 20 can be viewed through the gift storage compartment surface 30.

As depicted, the all-in-one gift packaging system also comprises an optional hanger 50. The hanger 50, as used herein, refers to any device which can be used or configured to hang or otherwise engage the shelving of a store so that the gift packaging system can be displayed for sale at a store. As depicted, the hanger 50 comprises a fully enclosed ring such that the ring is open and allows for a metal rod or other material to pass through the ring in order to hang the multipurpose greeting card 10 or the movable (can open or close) greeting card cover 60 (depicted in FIG. 2, and discussed below). In some embodiments, the hanger 50 can also comprise a hook, square, circle or loop that can be used to hang the multipurpose greeting card 10 or the expandable greeting card cover 60 in a store or other place. Virtually any type of retail hanger 50 can be utilized. In one embodiment the hanger 50 comprises perforation or other line of weakness which allow the hanger 50 to be removed when desired. For example, in one embodiment the hanger 50 is removed prior to the greeting card 10 being inserted into the envelope or other container. In other embodiments the hanger 50 is pushed down or hidden prior to being inserted into the envelope or other container.

Figure 2:
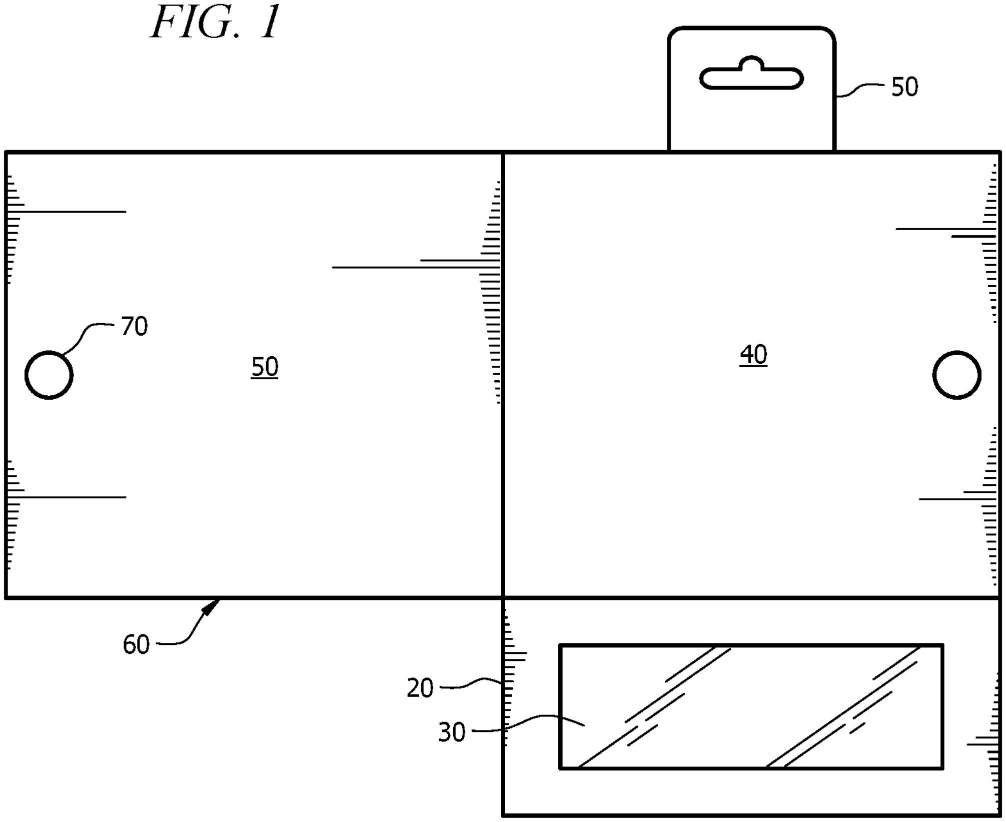
FIG. 2 is a top view of a greeting card with a movable cover in one embodiment.

FIG. 2 is a perspective view of a greeting card with a movable cover in one embodiment. FIG. 2 depicts a system comprising a multipurpose greeting card 10, an optional gift storage compartment 20, a flat greeting card portion 40, the optional hanger 50, a gift storage compartment surface 30, and a movable greeting card cover 60. The movable greeting card cover 60 can be moved from an open position wherein the greeting card portion 40 is visible to a closed position adjacent to the greeting card portion 40 wherein the greeting card portion 40 is not visible. In one embodiment the greeting card cover 60 is coupled to the greeting card portion 40 via a hinge such that the greeting card cover 60 can rotate between the open and closed positions. In one embodiment the greeting card cover 60 is not directly coupled to the gift storage compartment 20. Instead, for example, the gift storage compartment 20 is coupled to the greeting card portion 40 and not the greeting card cover 60. In this fashion, the greeting card cover 60 is free to open and close without moving the gift storage compartment. This is an advantage in that the gift storage compartment 20 is large and sometimes bulky. If the greeting card cover 60 were directly coupled to the gift storage compartment 20, the cover 60 would be difficult and cumbersome to move. Allowing the greeting card cover 60 to move without the weight of the gift storage compartment 20 increases the effectiveness of the cover 60.

In one embodiment, the multipurpose greeting card 10, flat greeting card portion 40, or movable greeting card cover 60 are opened alone or in combination from left-to-right, right-to-left, top-to-bottom, and/or bottom-to-top. In another embodiment, the multipurpose greeting card 10 is single-layered in that the gift storage compartment 20, flat greeting card portion 40, hanger 50, gift storage compartment surface 30, and a movable greeting card cover 60 are in a single layer instead of in a multi-layered configuration. However, it will be understood that in anther embodiment these same components can be configured in a multi-layered configuration. A multi-layered configuration is an embodiment wherein, for example, the greeting card cover 60 covers only a portion of the greeting card portion 40 such that it appears to have multiple layers.

The greeting card cover 60 has several advantages. First, it increases the available surface area upon which the users can provide graphics or a message. Second, it provides an opportunity to cover or hide the message or graphics located on the planar greeting card portion 40. In another embodiment, the greeting card cover 60 triggers a device, sensor, multipurpose greeting card 10, or other component of the multipurpose gift card 10. The trigger can be used to play music, emit sounds, play recorded videos or sounds, light up images, etc.

FIG. 2 also depicts an optional fastener 70 which used to secure the greeting card cover 60 to the greeting card portion 40. The fastener 70 can comprise any device or method for securing the greeting card cover 60 to the multipurpose greeting card 10 or the greeting card portion 40. The fastener 70 can include a magnet, hidden magnet, tape, an adhesive, a hook and loop fastener such as Velcro®, clear seal, clear wafer-sized seal, clear sticky substance, gummy sticky adhesive (re-closable if needed), what is commonly referred to in the industry as booger glue, glue, adhesive, or self-locking tab to secure the greeting card cover 60 to the multipurpose greeting card 10 or to the greeting card portion 40. In addition and in one embodiment, the fastener 70 may be hidden from view when the multipurpose greeting card 10 is unopened. In another embodiment, the fastener 70 can be located at a number of different positions on the greeting card cover 60 including the top, middle, bottom, left, right, or other locations of the greeting card cover 60. In another embodiment, a fastener 70 may also be located on the greeting card portion 40 and work with a fastener 70 located on the greeting card cover 60 to affix, attach, couple, or otherwise close the multipurpose greeting card 10. The fastener 70 can also comprise an external fastener which provides an external force to couple the multipurpose greeting card 10. An external fastener, in one embodiment, can comprise a wrap, a strap, a cellophane wrap, or other similar packaging.

Figure 3A:
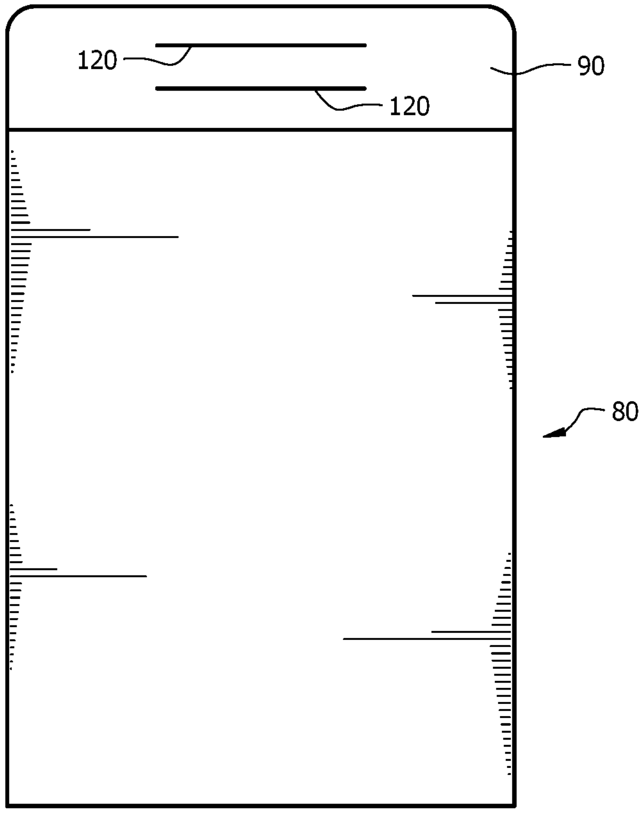
FIG. 3*a* is a top view of an optional expandable greeting card container that is configured to hold or contain the multipurpose greeting card in one embodiment.

FIG. 3A is a top view of an optional expandable greeting card container that is configured to hold or contain the multipurpose greeting card. As depicted, the expandable card container 80 has a volume or depth large enough to hold the multipurpose greeting card 10 or gift box therein, while also being configured to be collapsible or folding to a size capable of being removably stored. For example, in some embodiments, the expandable card container 80 may be an envelope, wrapping paper, gift box, gift bag, or a pleated envelope. As depicted, the card container 80 comprises a pleated envelope. In another embodiment, the expandable greeting card container 80 can be substantially flat before a multipurpose greeting card 10 is placed inside the expandable greeting card container 80 but then expand or unfold to be able to hold the multipurpose greeting card that contains a gift that has any volume or depth. In another embodiment, the expandable greeting card container 80 comprises a pleated envelope that can lie in folded-down position but then expand using the pleats when a multipurpose greeting card 10 is place inside of the expandable greeting card container 80.

In another embodiment, the expandable greeting card container 80 also comprises a fastening component 90, which can be configured to affix, close, or attach to the expandable greeting card container 80 in order to close or seal the expandable greeting card container 80. For example, the fastening component 90 can comprise paper, cardboard, or other type of tab that is used to close or seal the expandable greeting card container 80. In one embodiment, the fastening component 90 can comprise a magnet, hidden magnet, a glue-based composition, tab, loop and hook fasteners such Velcro®, a string and anchor fastener, slits, slots, adhesive, slider, envelope, no-melt glue with release, glue, a tie-up fastener, top, cover, any fastener disclosed herein, or any other fastener that can close the expandable greeting card container 80. In one embodiment the fastener 90 uses a self-tucking system such that no adhesive is used in fastening the expandable card container 80 to the multipurpose greeting card 10.

The greeting card container 80 can comprise virtually any shape, including the various shapes described above with reference to the greeting card 10. In one embodiment the greeting card container 80 has a similar shape to the greeting card 10 that it will contain. The fastening component 90 can comprise various lengths, widths, and shapes depending on the size, shape, or volume of the multipurpose greeting card 10 or the expandable greeting card container 80.

As depicted, the greeting card container 80 has one or more slits 130. The slits can be used to couple the greeting card container 80 to the hanger 50 coupled to the greeting card 10. As depicted, the greeting card container 80 has two slits 130. In such an embodiment, the hanger 50 can be inserted into the lower slit 130 and pulled through the top slit 130. In this fashion, the greeting card 10 would be in front of the greeting card container 80 and both would be coupled via the hanger 50. This provides the advantage of hanging both items with a single hanger 50. This has a further advantage of keeping a specific greeting card container 80 coupled to a specific greeting card 10. While in one embodiment, the greeting card container 80 and the specific greeting card 10 are sold as a single unit, in other embodiments, the greeting card container 80 and the greeting card 10 are presented and sold as separate units. In one example, the greeting card container 80 and the greeting card 10 will comprise different SKU's and separate price tags. In other embodiments, however, the greeting card container 80 and the greeting card 10 will be sold as a single unit, even if they are not packaged or presented as a single unit.

Figure 3B:
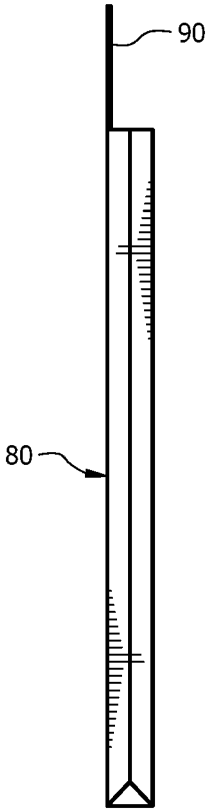
FIG. 3*b* is a side view of the expandable greeting card container of FIG. 3*a* in one embodiment.
Figure 4A:
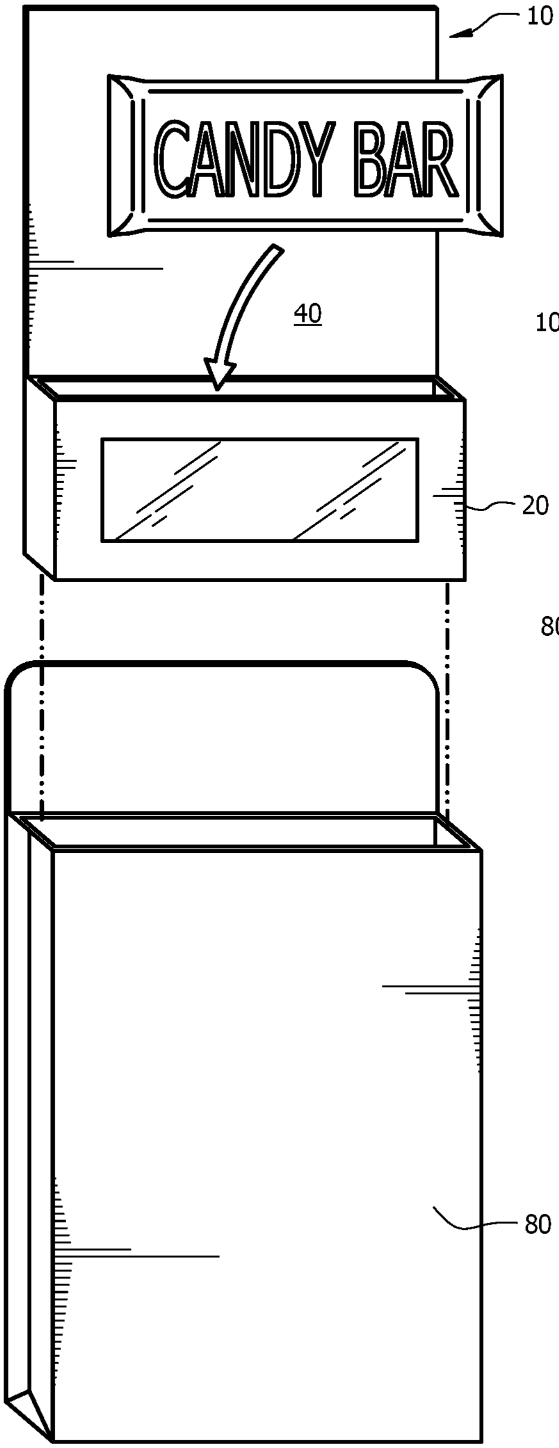
FIGS. 4*a* and 4*b* are perspective views of the greeting card being inserted into a container.
Figure 4B:
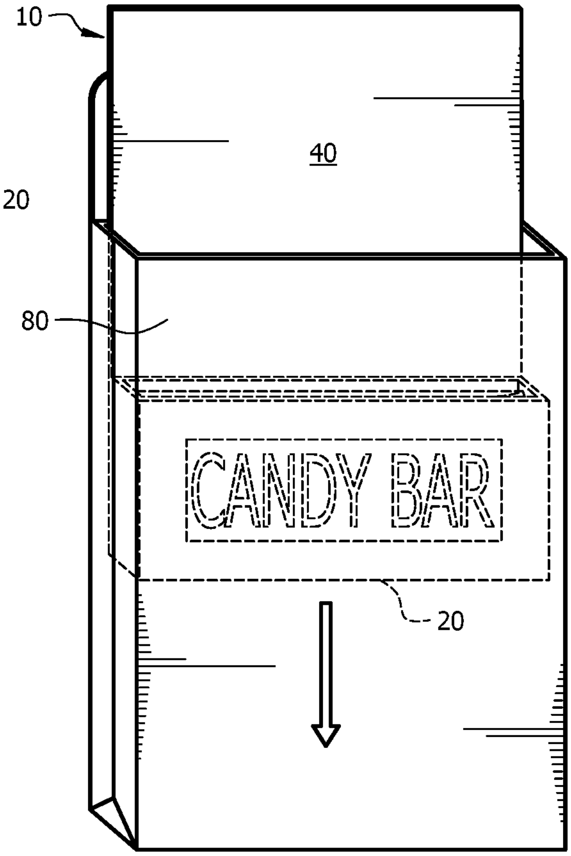

FIG. 3*b* depicts a side view of the greeting card container 80 shown in FIG. 3*a*. As can be seen, the greeting card container 80 depicted comprises pleats to allow the container to expand. FIGS. 4*a* and 4*b* are perspective views of the greeting card being inserted into a container. In the embodiment depicted, the greeting card does not comprise a hanger 50. Accordingly, the container 80 does not have slits as previously described.

As can be seen, the greeting card container 80 expands as necessary to accommodate the greeting card 10. Thereafter, the greeting card container 80 can be closed via fastener 90 as previously discussed. A message such as "To/From" or the like can be placed on the container 80. Other items such as postage, mailing addresses, etc. can also be placed on the container 80. As seen in FIG. 3C, the greeting card 10 comprises a greeting card portion 40 coupled to a gift storage compartment 20 having a certain depth and/or volume to hold a gift, gift card, candy, money, or other tangible item. The greeting card 10 depicted has a flat planar top portion coupled to at its bottom to a larger gift storage compartment. The greeting card 10 in such an embodiment has a cross sectional shape similar to a lowercase "b" or "h".

As discussed, in some embodiments the greeting card container 80 encompasses and fully surrounds the entire greeting card 10. This is for illustrative purposes only and should not be deemed limiting. In some embodiments the greeting card container 80 will comprise a strap or other coupling device which couples the greeting card 10 to another object.

Figure 5:
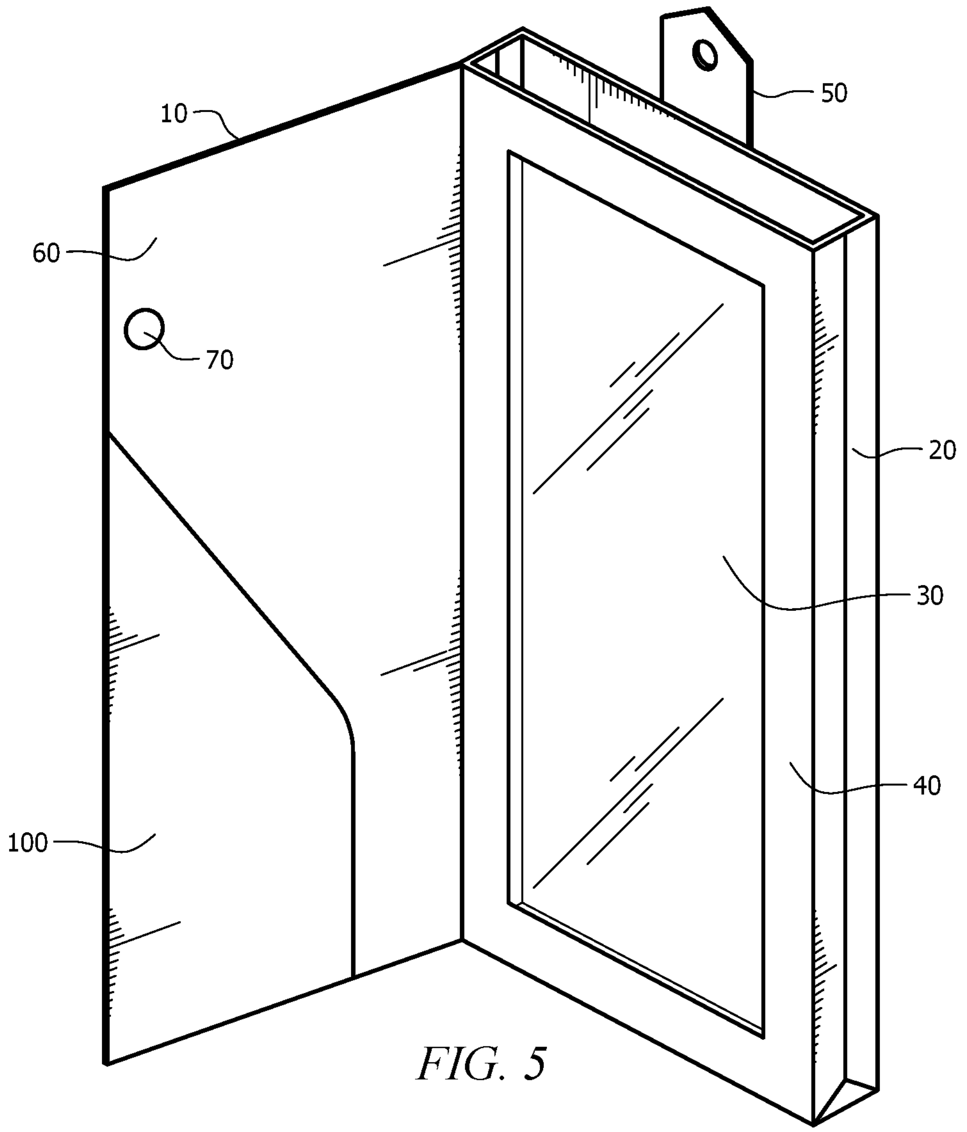
FIG. 5 is a perspective view of a multipurpose greeting card in one embodiment.

FIG. 5 is a perspective view of a multipurpose greeting card in one embodiment. In this embodiment, the gift storage compartment 20 comprises a length and width that is substantially similar to the multipurpose greeting card 10 such that the gift storage compartment 20 is configured to hold a gift that is close to or substantially similar in size to the multipurpose greeting card 10. Put differently, in one embodiment the gift storage compartment 20 comprises dimensions which are similar to the dimensions of the overall greeting card 10. This is an advantage, in some embodiments, because it provides a sleeker and more uniform appearance Another advantage provided by the multipurpose greeting card 10 is to provide an element of surprise, which as a recipient of the multipurpose greeting card 10 is opening up the greeting card his or her anticipation builds and he or she will not know the contents of the gift until the gift storage compartment 20 or multipurpose greeting card 10 is opened.

As depicted, the greeting card 10 further comprises a greeting card cover 60, as previously described. As depicted, the greeting card cover 60 comprises a flap 100 that can be used to hold a card, money, gift card, tickets, lottery tickets, small candy, or other items in place. When the greeting card cover 60 is in a closed position flush against the gift storage compartment 20, the greeting card cover 60 as well as the flap 100 act to secure the money, card, etc. which is held by the flap 100. The size and shape of the flap 100 can vary depending upon the item that it is securing. In still other embodiments, not depicted, the greeting card cover 60 comprises a slit, slot or other opening that can be used to hold a gift card, money, or other item in place. In still other embodiments, the cover 60 does not comprise the flap 100.

In another embodiment, the gift storage compartment 20 can have the same height as the greeting card cover 60 such that both are substantially equal or have a height that is substantially the same as the multipurpose greeting card 10 (See FIG. 4). In one embodiment, gift storage compartment 20 has a depth and/or volume as shown in FIG. 4, which can also have the substantially or near the same height or width of the greeting card portion where the gift storage compartment can hold an item that is substantially similar in height and width to the multipurpose greeting card 10.

If needed, and in some embodiments, the gift storage compartment 20 can further comprise Styrofoam, packing pellets, or other packing materials to fill space and provide cushion for the gift. Thus, if the gift in FIG. 4 was a small sculpture, for example, the gift storage compartment 20 can further comprise packing pellets, as an example, to prevent the sculpture from breaking during delivery, shipping, etc.

In one embodiment, the multipurpose greeting card 10 can also comprise a speaker, circuitry, and/or software that is capable of playing a message, such as a pre-recorded message. In one such embodiment, the multipurpose greeting card 10 is capable of playing a pre-recorded message or allowing a customer to record a message for the recipient of the multipurpose greeting card 10 using a speaker, circuitry, processor, and/or software configured to record and play a message. In another embodiment, the multipurpose greeting card 10 can be configured play a pre-recorded message or a message recorded after purchase of the multipurpose greeting card 10 wherein the circuitry configured to play and record the message is embedded within the multipurpose greeting card 10, gift storage compartment 20, greeting card portion 40, greeting card cover 60, and/or flap 100 such that most of the circuitry cannot be seen on the outside of the multipurpose greeting card except for a slit or other speaker component for playing the message. In another embodiment, the multipurpose greeting card 10 comprises a speaker, software, and a processor for recording or playing a pre-recorded message or is configured to allow a person to record a message using the speaker, software, and/or processor.

In still another embodiment, the greeting card 10 comprises telescoping or pop-up items known in the art. For example, the cover 60 may comprise tabs or items which can be pulled and extended to reveal another image, or message. Further, the cover 60 may provide sufficient force to keep folded or spring loaded items located on the greeting card portion 40 in a locked position but otherwise spring up when the cover 60 is opened. These and other features known in the art can be incorporated into the greeting card 10.

In one embodiment the greeting card portion 40 is not already coupled to the gift storage compartment 20, as has been depicted in the figures. Instead, it is presented as a mix and match greeting card plus gift system. This allows the user to better customize their gift. As an example, the customer may prefer the image and/or message on one gift card portion 40, and may prefer a different gift found in the gift storage compartment 20. Thus, for example, the gift storage compartments 20 may comprise a variety of gifts from which the user can choose. The user can then choose the desired gift storage compartment 20 and couple that with the desired greeting card portion 40. In one embodiment the gift storage compartment 20 and the greeting card portion 40 will comprise separate price tags, separate SKU's, etc. This allows differently priced gifts to be sold. As an example, a gift storage compartment 20 comprises a candy bar will have a significantly reduced price compared to a gift storage compartment 20 which has a $50 gift card. In other embodiments, however, the gift storage compartment 20 and the greeting card portion 40 will comprise a single price tag and be sold as a single unit. By presenting the ability to create mix and match, the user is better able to achieve their desired combination of gift card portion 40 and gift storage compartment. In another embodiment, the gift storage compartment is on a separate hanger than the container of the multipurpose greeting card 10.

Figure 6:
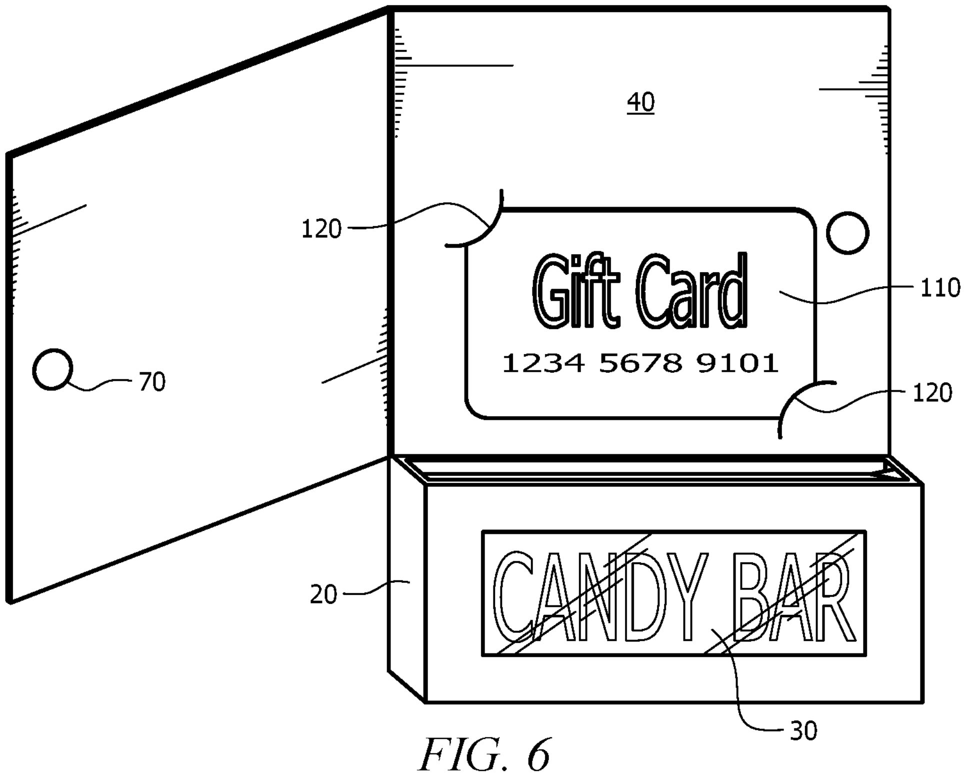
FIG. 6 is a front view of an embodiment comprising a gift card in one embodiment.

FIG. 6 is a front view of an embodiment comprising a gift card in one embodiment. The gift card 110 can be secured via any method or device, including fasteners, slots, etc. discussed herein. As depicted, the gift card 110 is secured via two slots 120 located on the greeting card portion 40. The gift card 110, in other embodiments can also be secured on either the front face or the rear face of the greeting card cover 60.

The greeting card depicted in FIG. 5 does not comprise a hang tag. Instead, it can be positioned on a shelf like other traditional greeting cards.

The multipurpose greeting card 10 discussed above has several advantages. First, it allows the user to couple a card with a gift. Previously, users had to separately purchase a greeting card and a gift, wrap each separately, and deliver each item separately. This was inefficient, expensive, and often resulted in the greeting card becoming separated from the gift. This problem is exaggerated at a baby shower, for example, where many gifts and cards are collected making it difficult to ascertain who the gift and/or cards are from. The multipurpose greeting card 10 discussed herein solves these problems. A user can purchase a single greeting card 10 which will include the greeting card as well as a container in which to store the gift. Further, the multipurpose greeting card 10 eliminates the need to separately wrap the gift as the gift can be stored within the greeting card 10 or in another alternative the envelope can serve as the wrap. Another advantage of the multipurpose gift card is that it serves as a one-stop shop for customers looking to provide a gift and card in one sleek package. In another example, the multipurpose gift card can be colored to match and ties together via color the card, gift card container, envelope, multipurpose greeting card 10, storage compartment 20, gift storage compartment surface 30, greeting card portion 40, or card cover 60.

An additional advantage is the ability to provide a uniform theme which was previously difficult, ineffective, or impossible. As an example, perhaps the greeting card has a “Happy New Year” message. The gift can then include a toy which shoots confetti, or a Happy New Year hat. In such embodiments, the theme presented in the card can match with the theme presented in the gift. In other embodiments the theme presented in the card and/or gift, can also match with the theme presented in the container.

As discussed above, in one embodiment the greeting portion 40, the cover 60, the gift storage compartment 20, and/or the greeting card container 80 can be customized by a user. A user can upload photos, text, images, sounds, videos, etc. to have those custom features incorporated into portions of the greeting card 10 or the greeting card container 80. Thus, if the theme is red, a red greeting card portion 40 can be coupled with a red cover 60, a red gift storage compartment 20, and packaged in a red greeting card container. Further, each or all of these components can include customized photos and text provided by the user. In one embodiment, the user can further select coordinating gift options to fill the greeting card container. Such a method and system offers increased user customization and flexibility.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the following claims.

Additional Disclosure

The following clauses are offered as further description of the disclosed invention.

Clause 1. A greeting card system, said system comprising:
- a greeting card;
- a greeting card container for receiving said greeting card;
- wherein said greeting card comprises a planar greeting card portion coupled to a gift storage compartment, wherein said gift storage compartment comprises a volume and depth for storing an item.

Clause 2. The system of any proceeding or preceding claim wherein said greeting card further comprises a greeting card cover, wherein said greeting card cover is moveably coupled to said planar greeting card portion to move from an open position to a closed position adjacent to said planar greeting card portion, and wherein said greeting card cover is not directly coupled to said gift storage compartment.

Clause 3. The system of any proceeding or preceding claim wherein said greeting card cover further comprises a fastener to secure said greeting card cover to said greeting card portion.

Clause 4. The system of any proceeding or preceding claim further comprising a flap located on said greeting card cover.

Clause 5. The system of any proceeding or preceding claim wherein said greeting card cover can open and close relative to said planar greeting card portion without moving said gift storage compartment.

Clause 6. The system of any proceeding or preceding claim wherein said gift storage compartment is coupled below said planar greeting card portion.

Clause 7. The system of any proceeding or preceding claim wherein said gift storage compartment further comprises a gift storage compartment surface.

Clause 8. The system of any proceeding or preceding claim wherein said gift storage compartment surface comprises a transparent window.

Clause 9. The system of any proceeding or preceding claim wherein said greeting card further comprises a hanger.

Clause 10. The system of any proceeding or preceding claim wherein said greeting card container is expandable.

Clause 11. The system of any proceeding or preceding claim wherein said gift storage compartment is releasably coupled to said planar greeting card portion.

Clause 12. A greeting card comprising:
- a planar greeting card portion;
- a greeting card cover moveably coupled to said planar greeting card portion to move from an open position to a closed position adjacent to said planar greeting card portion;
- a gift storage compartment coupled to said planar greeting card portion, wherein said gift storage compartment comprises a volume and depth for storing an item;

wherein said greeting card cover can open and close relative to said planar greeting card portion without moving said gift storage compartment.

Clause 13. The greeting card of any proceeding or preceding claim wherein said gift storage compartment further comprises a transparent window.

Clause 14. The greeting card of any proceeding or preceding claim wherein said greeting card cover is not directly coupled to said gift storage compartment.

Clause 15. The greeting card of any proceeding or preceding claim further comprising a greeting card container which encompasses said greeting card.

Clause 16. The greeting card of any proceeding or preceding claim wherein said gift storage compartment is releasably coupled to said planar greeting card portion.

Clause 17. The greeting card of any proceeding or preceding claim wherein said greeting card cover is coupled to said greeting card portion via a hinge.

Clause 18. The greeting card of any proceeding or preceding claim wherein said card is integrally made from a single sheet.

Clause 19. The greeting card of any proceeding or preceding claim further comprising a gift located in said gift storage compartment.

What is claimed is:

1. A greeting card system, said system comprising:

a greeting card;

wherein said greeting card comprises a planar greeting card portion coupled to a gift storage compartment, wherein said gift storage compartment comprises a volume and depth for storing an item;

wherein said greeting card further comprises a greeting card cover coupled to said greeting card, and wherein said greeting card cover is moveably coupled to said planar greeting card portion to move from an open position to a closed position adjacent to said planar greeting card portion;

wherein said planar greeting card portion has a planar face, and wherein said gift storage compartment has a planar front face; and wherein said planar face of said planar greeting card portion and said planar front face of said gift storage compartment are in substantially parallel vertical planes when said greeting card cover is in said open and closed positions;

wherein said gift storage compartment further comprises a gift storage compartment surface, and wherein said gift storage compartment surface comprises a transparent window;

and wherein said system further comprises slots to receive a gift card.

2. The system of claim 1 wherein said greeting card cover is not directly coupled to said gift storage compartment.

3. The system of claim 1 wherein said greeting card cover further comprises a fastener to secure said greeting card cover to said greeting card portion.

4. The system of claim 1 further comprising a flap located on said greeting card.

5. The system of claim 1 wherein said greeting card cover can open and close relative to said planar greeting card portion without moving said gift storage compartment.

6. The system of claim 1 wherein said gift storage compartment is coupled below said planar greeting card portion.

7. The system of claim 1 wherein said greeting card further comprises a hanger.

8. The system of claim 1 wherein said greeting card container is expandable.

9. The system of claim 1 wherein said gift storage compartment is releaseably coupled to said planar greeting card portion.

10. The system of claim 1 wherein said slots are located on said greeting card portion.

11. The system of claim 1 wherein said slots are located on said greeting card cover.

12. The system of claim 1 wherein said slots are located on a front face of said greeting card cover.

* * * * *